United States Patent
Ji et al.

(10) Patent No.: US 9,844,020 B2
(45) Date of Patent: *Dec. 12, 2017

(54) POSITIONING LOCATION FOR TRANSMITTERS WITH SAME PHYSICAL CELL IDENTITY (PCI)

(71) Applicant: QUALCOMM Incorporated, San Diego, CA (US)

(72) Inventors: Tingfang Ji, San Diego, CA (US); Ravi Palanki, Cupertino, CA (US); Peter Gaal, San Diego, CA (US); Hao Xu, San Diego, CA (US); Yongbin Wei, La Jolla, CA (US)

(73) Assignee: QUALCOM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/344,354

(22) Filed: Nov. 4, 2016

(65) Prior Publication Data

US 2017/0079003 A1    Mar. 16, 2017

Related U.S. Application Data

(60) Continuation of application No. 14/940,086, filed on Nov. 12, 2015, now Pat. No. 9,521,646, which is a
(Continued)

(51) Int. Cl.
*H04L 5/00* (2006.01)
*H04W 24/02* (2009.01)
(Continued)

(52) U.S. Cl.
CPC .............. *H04W 64/00* (2013.01); *G01S 5/02* (2013.01); *H04L 5/0048* (2013.01);
(Continued)

(58) Field of Classification Search
CPC .... H04L 5/0048; H04W 24/02; H04W 64/00; H04W 72/0406; H04W 72/042; H04W 72/0446; H04W 88/085
(Continued)

(56) References Cited

U.S. PATENT DOCUMENTS 6,289,280 B1  9/2001  Fernandez-Corbaton et al.
7,130,642 B2  10/2006 Lin
(Continued)

FOREIGN PATENT DOCUMENTS

CN  101621844 A  1/2010
JP  2003518632 A  6/2003
(Continued)

OTHER PUBLICATIONS

3GPP RAN WG1 #57bis R1-092305, "Positioning Support for Distributed Network Elements", LG-Nortel, pp. 103, Jun. 29-Jul. 3, 2009.
(Continued)

*Primary Examiner* — Wutchung Chu
(74) *Attorney, Agent, or Firm* — Seyfarth Shaw LLP

(57) ABSTRACT

A method of wireless communication includes generating a position reference signal (PRS) for a transmitter having a same physical cell identity (PCI) as a macro eNodeB. The PRS is based on a virtual cell ID and/or cell global identification (CGI) of the transmitter such that the PRS is different from a PRS of the macro eNodeB. The method also includes transmitting the PRS.

20 Claims, 9 Drawing Sheets

Related U.S. Application Data division of application No. 13/401,696, filed on Feb. 21, 2012, now Pat. No. 9,258,718.

(60) Provisional application No. 61/445,489, filed on Feb. 22, 2011.

(51) Int. Cl.

| | |
|---|---|
| *H04W 64/00* | (2009.01) |
| *H04W 72/04* | (2009.01) |
| *G01S 5/02* | (2010.01) |
| *H04W 88/08* | (2009.01) |
| *G01S 1/20* | (2006.01) |

(52) U.S. Cl.
CPC ....... *H04W 24/02* (2013.01); *H04W 72/0406* (2013.01); *H04W 72/0446* (2013.01); *G01S 1/20* (2013.01); *H04W 72/042* (2013.01); *H04W 88/085* (2013.01)

(58) Field of Classification Search
USPC ............... 370/241, 328, 329, 336, 350, 468; 455/456.1
See application file for complete search history.

(56) References Cited

U.S. PATENT DOCUMENTS

| | | | |
|---|---|---|---|
| 7,940,740 B2 | 5/2011 | Krishnamurthy et al. | |
| 8,437,288 B2 | 5/2013 | Edge et al. | |
| 8,682,389 B2 | 3/2014 | Siomina et al. | |
| 8,730,925 B2* | 5/2014 | Frank | G01S 5/0205 370/241 |
| 9,060,328 B2* | 6/2015 | Marinier | H04W 36/22 |
| 9,072,066 B2 | 6/2015 | Kazmi et al. | |
| 9,237,417 B2 | 1/2016 | Marshall et al. | |
| 9,258,718 B2 | 2/2016 | Ji et al. | |
| 2010/0172311 A1 | 7/2010 | Agrawal et al. | |
| 2010/0260154 A1 | 10/2010 | Frank et al. | |
| 2010/0317343 A1 | 12/2010 | Krishnamurthy et al. | |
| 2011/0039574 A1 | 2/2011 | Charbit et al. | |
| 2011/0105144 A1* | 5/2011 | Siomina | G01S 5/0215 455/456.1 |
| 2011/0124347 A1 | 5/2011 | Chen et al. | |
| 2011/0176440 A1 | 7/2011 | Frank et al. | |
| 2011/0190005 A1 | 8/2011 | Cheon et al. | |
| 2011/0230144 A1 | 9/2011 | Siomina et al. | |
| 2012/0040696 A1* | 2/2012 | Siomina | G01S 5/0036 455/456.6 |
| 2012/0108270 A1 | 5/2012 | Kazmi et al. | |
| 2012/0122472 A1 | 5/2012 | Krishnamurthy et al. | |
| 2012/0182951 A1* | 7/2012 | Okubo | H04W 64/00 370/329 |
| 2012/0195286 A1 | 8/2012 | Kim et al. | |
| 2013/0023285 A1* | 1/2013 | Markhovsky | G01S 3/74 455/456.1 |
| 2013/0051317 A1 | 2/2013 | Ji et al. | |
| 2013/0315195 A1 | 11/2013 | Ko et al. | |
| 2016/0072616 A1 | 3/2016 | Ji et al. | |
| 2016/0112983 A1 | 4/2016 | Ji et al. | |

FOREIGN PATENT DOCUMENTS

| | | |
|---|---|---|
| JP | 2006520171 A | 8/2006 |
| JP | 2009529835 A | 8/2009 |
| JP | 2009246733 A | 10/2009 |
| JP | 2012531583 A | 12/2012 |
| WO | 2001048506 A2 | 7/2001 |
| WO | 2004080105 A2 | 9/2004 |
| WO | 07103975 A2 | 9/2007 |
| WO | 2009129261 A1 | 10/2009 |
| WO | 2010107224 A2 | 9/2010 |
| WO | 2010151217 A2 | 12/2010 |

OTHER PUBLICATIONS

ETRI, "Discussion on further details of Scenario 4", 3GPP Draft; R1-111000 Comp Scenario 4, 3rd Generation Partnership Project (3GPP), Mobile Competence Centre ; 650, Route Des Lucioles ; F-06921 Sophia-Antipolis Cedex ; France, vol. RAN WG1, No. Taipei, Taiwan; Feb. 21, 2011, Feb. 15, 2011 (Feb. 15, 2011) , XP050490699.

Intel Corporation (UK) : "Proposal on functional evaluation of the low power RRHs deployment with common Cell ID (Scenario 4)", 3GPP Draft; R1-110972, 3rd Generation Partnership Project (3GPP), Mobile Competence Centre; 650, Route Des Lucioles; F-06921 Sophia-Antipolis Cedex; France, vol. RAN WG1, No. Taipei, Taiwan; 2011, Feb. 15, 2011, XP050490687, [retrieved on Feb. 15, 2011].

International Search Report and Written Opinion—PCT/US2012/026023—ISA/EPO—dated Jun. 4, 2012.

Partial International Search Report and Written Opinion—PCT/US2012/026023—ISAEPO—dated Apr. 12, 2012.

European Search Report—EP16199799—Search Authority—Munich—dated Jan. 31, 2017.

\* cited by examiner

POSITIONING LOCATION FOR TRANSMITTERS WITH SAME PHYSICAL CELL IDENTITY (PCI)

CROSS-REFERENCE TO RELATED APPLICATIONS

This application is a continuation of U.S. patent application Ser. No. 14/940,086, entitled "POSITIONING LOCATION FOR REMOTE RADIO HEADS (RRH) WITH SAME PHYSICAL CELL IDENTITY (PCI)," filed on Nov. 12, 2015, which is a divisional of U.S. patent application Ser. No. 13/401,696, entitled "POSITIONING LOCATION FOR REMOTE RADIO HEADS (RRH) WITH SAME PHYSICAL CELL IDENTITY (PCI)," filed on Feb. 21, 2012, now U.S. Pat. No. 9,258,718, which claims the benefit under 35 U.S.C. §119(e) to U.S. Provisional Patent Application No. 61/445,489 entitled "POSITIONING LOCATION FOR REMOTE RADIO HEADS (RRH) WITH SAME PCI," filed on Feb. 22, 2011, the disclosures of which are expressly incorporated by reference herein in their entireties.

BACKGROUND

Field

Aspects of the present disclosure relate generally to wireless communication systems, and more particularly to configuring remote radio heads.

Background

Wireless communication networks are widely deployed to provide various communication services such as voice, video, packet data, messaging, broadcast, etc. These wireless networks may be multiple-access networks capable of supporting multiple users by sharing the available network resources. A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

One aspect discloses a method of wireless communication. The method includes configuring a plurality of remote radio heads (RRHs) where each RRH has the same physical cell identity (PCI) as a macro eNodeB. The RRHs are configured to prevent position location reference signal (PRS) transmissions on subframes where a macro eNodeB transmits PRS. The method also includes communicating in accordance with the configuration.

In another aspect, a method of wireless communication discloses configuring a plurality of remote radio heads (RRHs). Uplink transmissions are received from a user equipment (UE) and the position location of the UE is determined based on received signal time difference (RSTD) measurements of the received uplink transmissions at the RRHs and macro eNodeB.

In another aspect, the method of wireless communication discloses generating a position location reference signal (PRS) for a transmitter. The PRS is generated based a virtual cell ID and/or unique cell global identification (CGI) of the transmitter. The position location reference signal is then transmitted.

Another aspect discloses a wireless communication having a memory and at least one processor coupled to the memory. The processor(s) is configures a plurality of remote radio heads (RRHs), where each RRH has a same physical cell identity (PCI) as a macro eNodeB. The RRHs are configured to prevent position location reference signal (PRS) transmissions on subframes where a macro eNodeB transmits PRS. The processor is configured to communicate in accordance with the RRH configurations.

In another aspect, the wireless communication discloses a processor(s) configuring a plurality of remote radio heads (RRHs). The processor(s) is also configured to receive uplink transmissions from a user equipment (UE). The processor(s) is also configured to determine a position location of the UE based on received signal time difference (RSTD) measurements of the received uplink transmissions at the RRHs and macro eNodeB.

In another aspect, the wireless communication discloses a processor(s) configured to generate a position location reference signal (PRS) for a transmitter. The PRS is based on a virtual cell ID and/or a unique cell global identification (CGI) of the transmitter. The processor is also configured to transmit the position location reference signal.

Another aspect discloses a computer program product for wireless communications in a wireless network having a non-transitory computer-readable medium is disclosed. The computer-readable medium has non-transitory program code recorded thereon which, when executed by the processor(s), causes the processor(s) to perform operations of configuring a plurality of remote radio heads (RRHs), where each RRH has a same physical cell identity (PCI) as a macro eNodeB, to prevent position location reference signal (PRS) transmissions on subframes where a macro eNodeB transmits PRS. The program code also causes the processor(s) to communicate in accordance with the configuration.

In another aspect, the computer program product for wireless communications discloses a computer-readable medium, when executed by the processor(s), causes the processor(s) to configure a plurality of remote radio heads (RRHs) and to receive uplink transmissions from a user equipment (UE). The program code also causes the processor(s) to determine a position location of the UE based on received signal time difference (RSTD) measurements of the received uplink transmissions at the RRHs and macro eNodeB.

In another aspect, the computer program product for wireless communications discloses a computer-readable medium, when executed by the processor(s), causes the processor(s) to generate a position location reference signal (PRS) for a transmitter based on a virtual cell ID and/or unique cell global identification (CGI) of the transmitter. The program code also causes the processor(s) to transmit the position location reference signal.

Another aspect discloses an apparatus for wireless communication and includes means for configuring a plurality of remote radio heads (RRHs) to prevent position location reference signal (PRS) transmissions on subframes where a macro eNodeB transmits PRS. Each of the RRHs have a same physical cell identity (PCI) as a macro eNodeB. Also included is means for communicating in accordance with the configuration.

In another aspect, the apparatus discloses means for configuring a plurality of remote radio heads (RRHs) and means for receiving uplink transmissions from a user equipment (UE). Also included is means for determining a position location of the UE based on received signal time difference (RSTD) measurements of the received uplink transmissions at the RRHs and macro eNodeB.

In another aspect, the apparatus discloses means for generating a position location reference signal (PRS) for a transmitter based on a virtual cell ID and/or unique cell global identification (CGI) of the transmitter. Also included is means for transmitting the position location reference signal.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA) and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
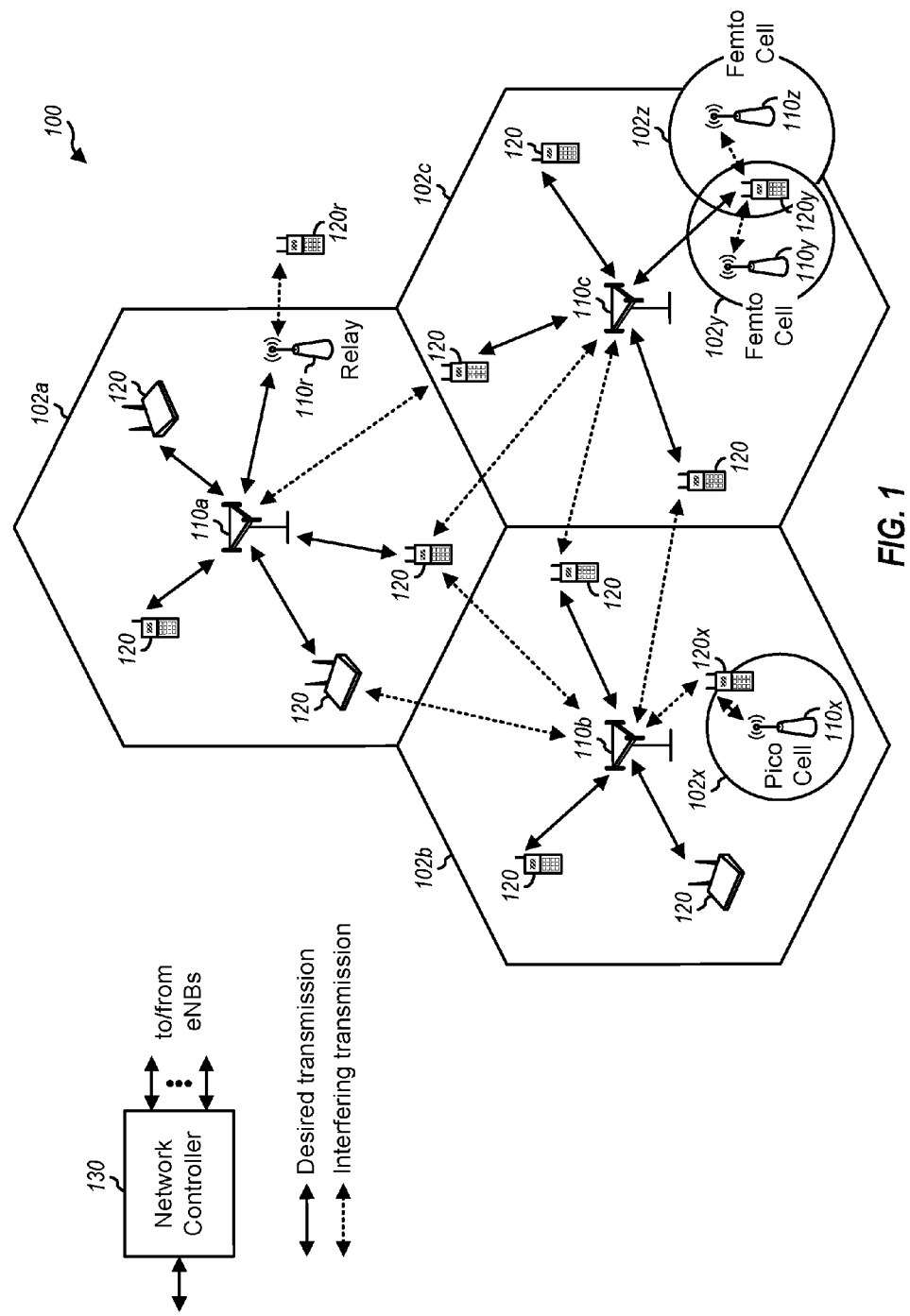
FIG. 1 is a block diagram conceptually illustrating an example of a telecommunications system.

FIG. 1 shows a wireless communication network 100, which may be an LTE-A network, with configurable remote radio heads. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 (e.g., UE 120x, UE 120y, etc.) are dispersed throughout the wireless network 100, and each UE may be stationary or mobile. A UE may also be referred to as a terminal, a user terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smart book, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
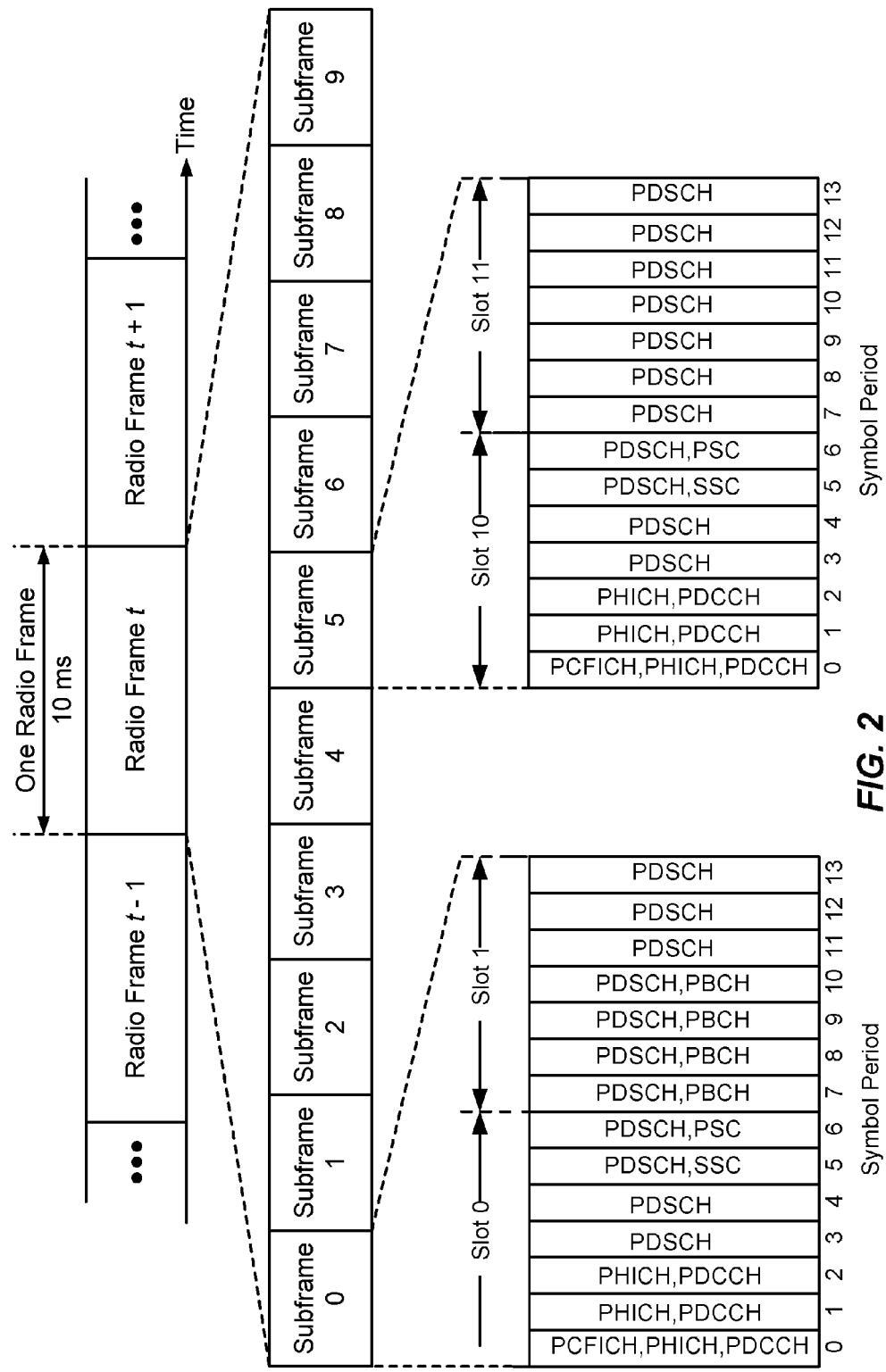
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic repeat request (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
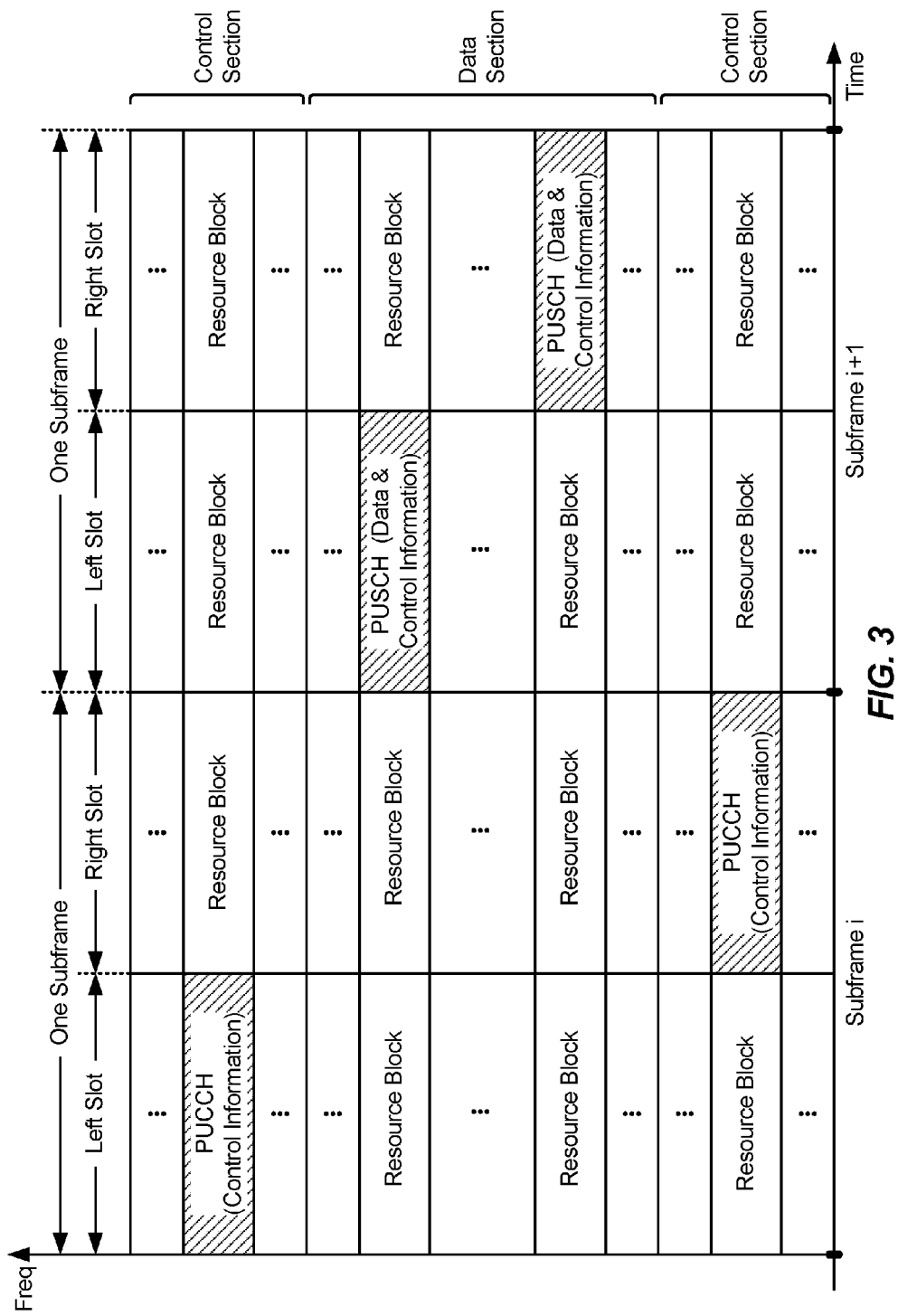
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC (primary synchronization carrier), SSC (secondary synchronization carrier), CRS (common reference signal), PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
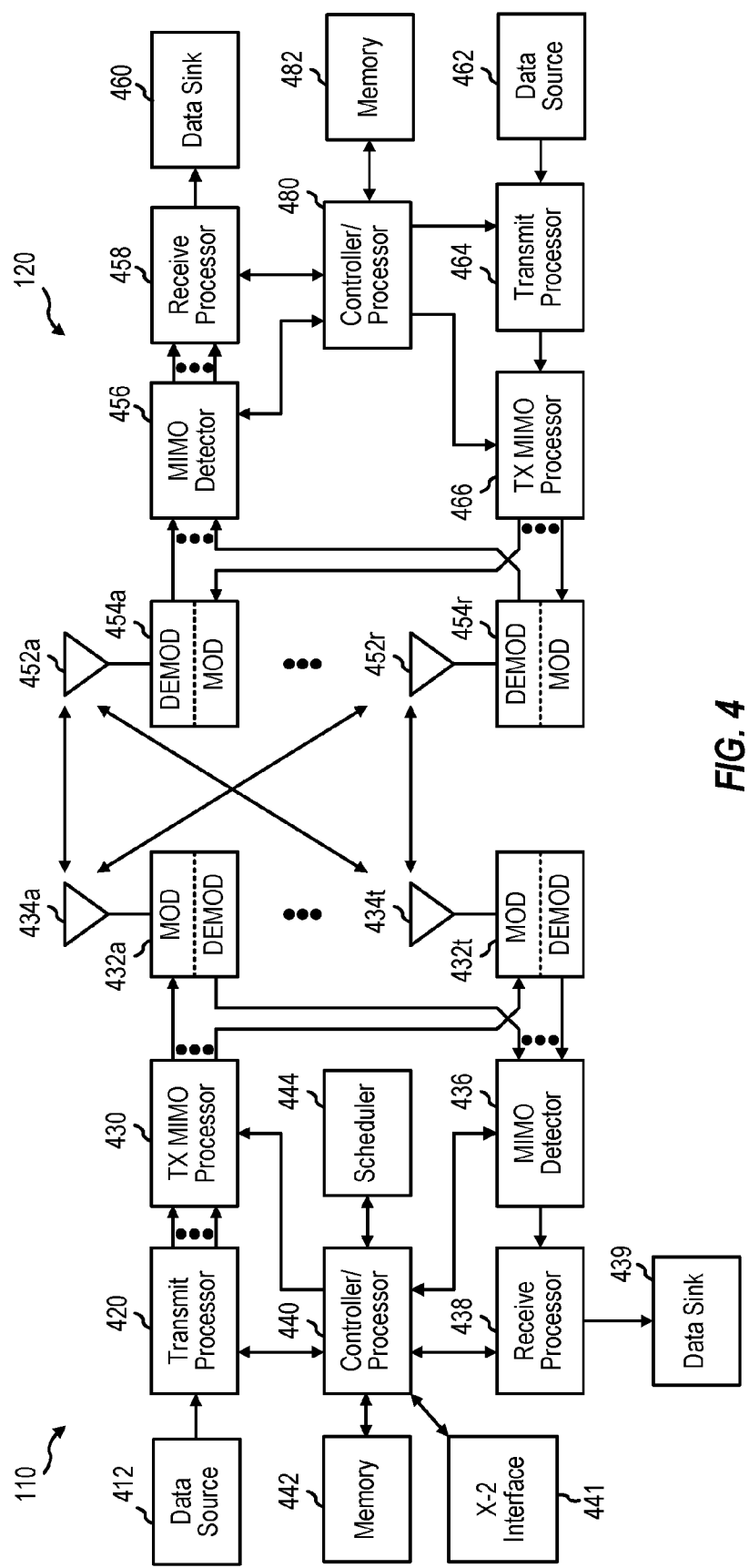
FIG. 4 is a block diagram conceptually illustrating a design of a base station/eNodeB and a UE configured according to an aspect of the present disclosure.

FIG. 4 shows a block diagram of a design of a base station/eNodeB 110 and a UE 120, which may be one of the base stations/eNodeBs and one of the UEs in FIG. 1. For example, the base station 110 may be the macro eNodeB 110c in FIG. 1, and the UE 120 may be the UE 120y. The base station 110 may also be a base station of some other type, such as a remote radio head (RRH), Pico eNodeB 110x or femto eNodeB 110y. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440/480 and/or other processors and modules at the base station 110/UE 120 may perform or direct the execution of the functional blocks illustrated in method flow chart FIGS. 6A and 6B, and/or other processes for the techniques described herein. The memories 442 and 482 may store data and program codes for the base station 110 and the UE 120, respectively. A scheduler 444 may schedule UEs for data transmission on the downlink and/or uplink.

Heterogeneous Network

Wireless networks may have eNodeBs of different power classes. For example, three power classes may be defined, in decreasing power class, as macro eNodeBs, pico eNodeBs, and femto eNodeBs. Networks featuring such different power class eNodeBs may be referred to as heterogeneous networks. When macro eNodeBs, pico eNodeBs, and femto eNodeBs are in a co-channel deployment, the power spectral density (PSD) of the macro eNodeB (aggressor eNodeB) may be larger than the PSD of the pico eNodeB and the femto eNodeB (victim eNodeBs) creating large amounts of interference with the pico eNodeB and the femto eNodeB. Protected subframes may be used to reduce or minimize interference with the pico eNodeBs and femto eNodeBs. That is, a protected subframe may be scheduled for the victim eNodeB to correspond with a prohibited subframe on the aggressor eNodeB.

Referring back to FIG. 1, the heterogeneous wireless network 100 uses the diverse set of eNodeBs 110 (i.e., macro eNodeBs, pico eNodeBs, femto eNodeBs, and relays) to improve the spectral efficiency of the system per unit area. The macro eNodeBs 110a-c are usually carefully planned and placed by the provider of the wireless network 100. The macro eNodeBs 110a-c generally transmit at high power levels (e.g., 5 W-40 W). The pico eNodeB 110x and the relay 110r, which generally transmit at substantially lower power levels (e.g., 100 mW-2 W), may be deployed in a relatively unplanned manner to eliminate coverage holes in the coverage area provided by the macro eNodeBs 110a-c and improve capacity in the hot spots. The femto eNodeBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNodeB that may communicate with the other eNodeBs 110 of the wireless network 100 to perform resource coordination and coordination of interference management. The femto eNodeBs 110y-z typically also transmit at substantially lower power levels (e.g., 100 mW-2 W) than the macro eNodeBs 110a-c.

In operation of a heterogeneous network, such as the wireless network 100, each UE is usually served by the eNodeB 110 with the better signal quality, while the unwanted signals received from the other eNodeBs 110 are treated as interference. While such operational principals can lead to significantly sub-optimal performance, gains in network performance are realized in the wireless network 100 by using intelligent resource coordination among the eNodeBs 110, better server selection strategies, and more advanced techniques for efficient interference management.

A pico eNodeB, such as the pico eNodeB 110x, is characterized by a substantially lower transmit power when compared with a macro eNodeB, such as the macro eNodeBs 110a-c. A pico eNodeB will also usually be placed around a network, such as the wireless network 100, in an ad hoc manner. Because of this unplanned deployment, wireless networks with pico eNodeB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNodeBs 110a-c and the pico eNodeB 110x implies that, in a mixed deployment, the downlink coverage area of the pico eNodeB 110x will be much smaller than that of the macro eNodeBs 110a-c.

In the uplink case, however, the signal strength of the uplink signal is governed by the UE, and, thus, will be similar when received by any type of the eNodeBs 110. With the uplink coverage areas for the eNodeBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNodeB more difficult in the wireless network 100 than in a macro eNodeB-only homogeneous network, where the downlink and uplink handover boundaries are more closely matched.

Range Extension

If server selection is based predominantly on downlink received signal strength, as provided in the LTE Release 8 standard, the usefulness of mixed eNodeB deployment of heterogeneous networks, such as the wireless network 100, will be greatly diminished. This is because the larger coverage area of the higher powered macro eNodeBs, such as the macro eNodeBs 110a-c, limits the benefits of splitting the cell coverage with the pico eNodeBs, such as the pico eNodeB 110x, because, the higher downlink received signal strength of the macro eNodeBs 110a-c will attract all of the available UEs, while the pico eNodeB 110x may not be serving any UE because of its much weaker downlink transmission power. Moreover, the macro eNodeBs 110*a-c* will likely not have sufficient resources to efficiently serve those UEs. Therefore, the wireless network 100 will attempt to actively balance the load between the macro eNodeBs 110*a-c* and the pico eNodeB 110*x* by expanding the coverage area of the pico eNodeB 110*x*. This concept is referred to as range extension.

The wireless network 100 achieves this range extension by changing the manner in which server selection is determined. Instead of basing server selection on downlink received signal strength, selection is based more on the quality of the downlink signal. In one such quality-based determination, server selection may be based on determining the eNodeB that offers the minimum path loss to the UE. Additionally, the wireless network 100 provides a fixed partitioning of resources equally between the macro eNodeBs 110*a-c* and the pico eNodeB 110*x*. However, even with this active balancing of load, downlink interference from the macro eNodeBs 110*a-c* should be mitigated for the UEs served by the pico eNodeBs, such as the pico eNodeB 110*x*. This can be accomplished by various methods, including interference cancellation at the UE, resource coordination among the eNodeBs 110, or the like.

In a heterogeneous network with range extension, such as the wireless network 100, in order for UEs to obtain service from the lower-powered eNodeBs, such as the pico eNodeB 110*x*, in the presence of the stronger downlink signals transmitted from the higher-powered eNodeBs, such as the macro eNodeBs 110*a-c*, the pico eNodeB 110*x* engages in control channel and data channel interference coordination with the dominant interfering ones of the macro eNodeBs 110*a-c*. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNodeBs. In subframes assigned to a first eNodeB, neighbor eNodeBs do not transmit. Thus, interference experienced by a UE served by the first eNodeB is reduced. Subframe assignment may be performed on both the uplink and downlink channels.

Adaptive Resource Partitioning

For example, subframes may be allocated between three classes of subframes: protected subframes (U subframes), prohibited subframes (N subframes), and common subframes (C subframes). Protected subframes are assigned to a first eNodeB for use exclusively by the first eNodeB. Protected subframes may also be referred to as "clean" subframes based on the lack of interference from neighboring eNodeBs. Prohibited subframes are subframes assigned to a neighbor eNodeB, and the first eNodeB is prohibited from transmitting data during the prohibited subframes. For example, a prohibited subframe of the first eNodeB may correspond to a protected subframe of a second interfering eNodeB. Thus, the first eNodeB is the only eNodeB transmitting data during the first eNodeB's protected subframe. Common subframes may be used for data transmission by multiple eNodeBs. Common subframes may also be referred to as "unclean" subframes because of the possibility of interference from other eNodeBs.

At least one protected subframe is statically assigned per period. In some cases only one protected subframe is statically assigned. For example, if a period is 8 milliseconds, one protected subframe may be statically assigned to an eNodeB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Figure 5:
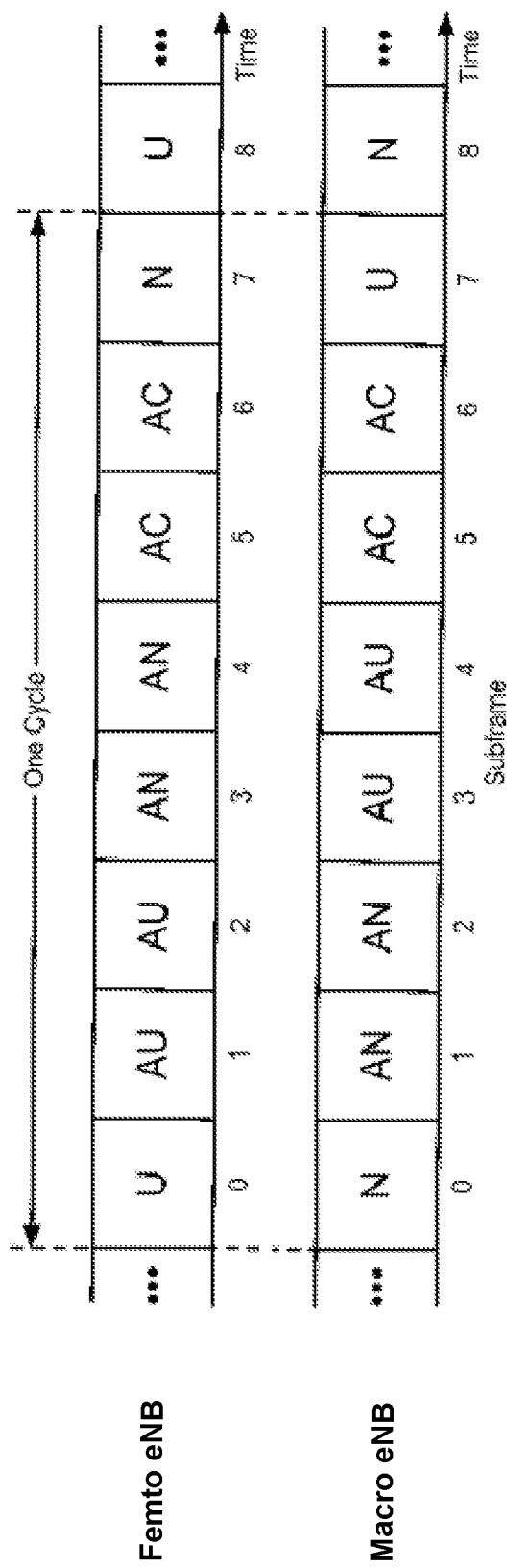
FIG. 5 is a block diagram conceptually illustrating adaptive resource partitioning in a heterogeneous network according to one aspect of the disclosure.

FIG. 5 is a block diagram illustrating TDM partitioning in a heterogeneous network according to one aspect of the disclosure. A first row of blocks illustrate sub frame assignments for a femto eNodeB, and a second row of blocks illustrate sub frame assignments for a macro eNodeB. Each of the eNodeBs has a static protected sub frame during which the other eNodeB has a static prohibited sub frame. For example, the femto eNodeB has a protected sub frame (U sub frame) in sub frame 0 corresponding to a prohibited sub frame (N sub frame) in sub frame 0. Likewise, the macro eNodeB has a protected sub frame (U sub frame) in sub frame 7 corresponding to a prohibited sub frame (N sub frame) in sub frame 7. Sub frames 1-6 are dynamically assigned as either protected sub frames (AU), prohibited sub frames (AN), and common sub frames (AC). The dynamically assigned subframes (AU/AN/AC) are referred to herein collectively as "X" subframes. During the dynamically assigned common sub frames (AC) in sub frames 5 and 6, both the femto eNodeB and the macro eNodeB may transmit data.

Protected sub frames (such as U/AU sub frames) have reduced interference and a high channel quality because aggressor eNodeBs are prohibited from transmitting. Prohibited sub frames (such as N/AN sub frames) have no data transmission to allow victim eNodeBs to transmit data with low interference levels. Common sub frames (such as C/AC sub frames) have a channel quality dependent on the number of neighbor eNodeBs transmitting data. For example, if neighbor eNodeBs are transmitting data on the common sub frames, the channel quality of the common sub frames may be lower than the protected sub frames. Channel quality on common sub frames may also be lower for extended boundary area (EBA) UEs strongly affected by aggressor eNodeBs. An EBA UE may belong to a first eNodeB but also be located in the coverage area of a second eNodeB. For example, a UE communicating with a macro eNodeB that is near the range limit of a femto eNodeB coverage is an EBA UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNodeBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNodeBs. A dominant interference scenario may occur due to restricted association. For example, in FIG. 1, the UE 120y may be close to the femto eNodeB 110y and may have high received power for the eNodeB 110y. However, the UE 120y may not be able to access the femto eNodeB 110y due to restricted association and may then connect to the macro eNodeB 110c (as shown in FIG. 1) or to the femto eNodeB 110z also with lower received power (not shown in FIG. 1). The UE 120y may then observe high interference from the femto eNodeB 110y on the downlink and may also cause high interference to the eNodeB 110y on the uplink. Using coordinated interference management, the eNodeB 110c and the femto eNodeB 110y may communicate over the backhaul to negotiate resources. In the negotiation, the femto eNodeB 110y agrees to cease transmission on one of its channel resources, such that the UE 120y will not experience as much interference from the femto eNodeB 110y as it communicates with the eNodeB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNodeBs. The eNodeBs in a synchronous system are presumptively synchronized across the system. However, for example, considering a UE that is a distance of 5 km from the macro eNodeB, the propagation delay of any downlink signals received from that macro eNodeB would be delayed approximately 16.67 μs (5 km÷3×108, i.e., the speed of light, 'c'). Comparing that downlink signal from the macro eNodeB to the downlink signal from a much closer femto eNodeB, the timing difference could approach the level of a time tracking loop (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Positioning Location for Remote Radio Heads (RRH) with Same Physical Cell Identity (PCI)

Currently, a UE's location is determined by the network. A position location server may rely on a UE to detect a time difference between signals received from various macro base stations. The UE reports the detected time difference back to the position location server. The location server then compiles the received data and through triangulation determines the location of the UE. One example system includes one or more remote radio head (RRH), which is similar to a base station of a pico cell, and one or more macro eNodeB (eNodeB), which is a base station of a macro cell. In some configurations, such as CoMP (coordinated multi point) configurations, the remote radio heads and macro eNodeB have the same physical cell ID (PCI). A position reference signal (PRS) is generated based on or derived from the physical cell ID of the transmitting node (e.g. RRH, pico cell, or macro eNodeB). When the resulting position reference signals (PRSs) transmitted from the remote radio heads and macro cells is the same, then determining the position location of the UE may be affected. For example, if the UE is far from the eNodeB, but close to the remote radio head, the UE reports back the position reference signal from the eNodeB, which is the same as the position reference signal from the remote radio head. Consequently, the location server will interpret the information incorrectly, as though the UE is near the eNodeB. The present disclosure helps prevent different nodes from transmitting the same position reference signal (PRS).

In one aspect of the present disclosure, the position location reference signal (PRS) transmissions from the remote radio head are silenced. In other words, the remote radio head does not transmit the position reference signal. This allows the macro eNodeB to transmit the position reference signal and the UE to respond accurately. Silencing the position reference signal transmission does not involve any input from the network side. Advantages of this solution include easy scaling at the location server and not having to re-plan position reference signal re-use. In another aspect, all nodes with the same position reference signal, except the highest power node, may be silenced. For example, in aspects where the eNodeB has the highest power, the lower powered remote radio heads are silenced. In some aspects, only nodes considered low power nodes (e.g., RRHs, pico cells and femto cells), with the same position reference signal are silenced.

In another aspect, a new identification is assigned to each remote radio head. In particular, in one configuration, a new virtual identification (ID) is assigned to each remote radio head and eNodeB. The virtual ID, not the PCI (physical cell ID), is then used to generate the position reference signal, resulting in different position reference signals for the remote radio heads and eNodeB. This provides a known location for the remote radio head, which may increase accuracy for determining position location.

In another aspect, an identifier such as the cell global identification (CGI) of each remote radio head and eNodeB may be used to generate the position reference signal. The cell global identification (CGI) may also be referred to as a global cell identification (GCI). Using the cell global identification (CGI) to generate the position reference signal provides a known location for the remote radio head, which again may increase accuracy for determining position location. Additionally reuse is coordinated and CGIs are provided that do not collide with existing IDs. The location server may configure the remote radio heads in different macro cells to avoid CGI collision. The UE may be informed of the position reference signal configuration of at least one macro cell and one or more remote radio heads. Thus, the UEs are aware of which cells to measure. The UEs that are close to a neighboring macro cell may also be informed of the position reference signal configurations of neighboring macros cells.

In yet another aspect, a schedule or pattern is mapped that illustrates when each of the nodes is broadcasting a position reference signal. The UE is informed of this mapping function and the position of the UE can then be calculated because the UE knows from which node the position reference signal was transmitted, even though the position reference signal itself may not identify (or explicitly reveal) which node transmitted the signal. In this configuration, the UE location can be determined even if the nodes are transmitting the same position reference signal, because not all the nodes are transmitting the position reference signals at the same time.

In another example, uplink transmissions are used for location determinations. For example, the reference time signal difference (RSTD) may be measured at each node for triangulation based on sounding reference signals (SRSs), physical uplink control channel (PUCCH) transmissions or physical uplink shared channel (PUSCH) transmissions. In one example, the macro cell and associated remote radio head location is known by the location server. Additionally, in another example, the position location based on uplink data may be merged with downlink measurements when the remote radio head position reference signal transmissions are silenced or when the position reference signal is derived from a unique virtual ID or the assigned cell global identification (CGI).

Figure 6:
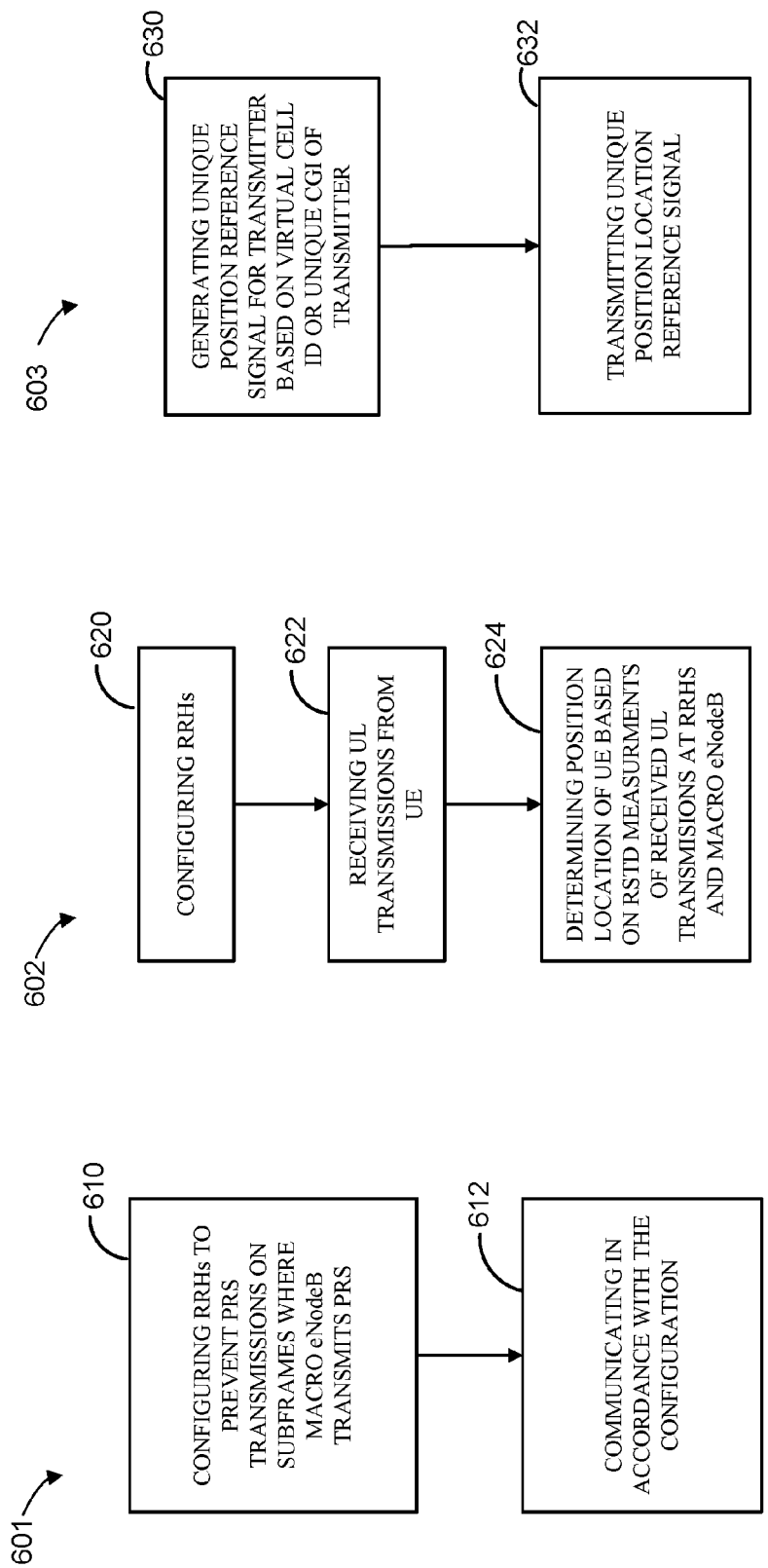
FIGS. 6A-6C are block diagrams illustrating methods for configuring remote radio heads (RRHs) to determine positioning locations.

FIGS. 6A-6C are block diagrams illustrating methods for configuring remote radio heads. FIG. 6A provides a method 601 where multiple remote radio heads (RRHs) are configured. At block, 610 the RRHs are configured to prevent position reference signal (PRS) transmissions on the same subframes where a macro eNodeB transmits PRS. The RRHs having the same physical cell ID (PCI) as a macro eNodeB, and a lower power than the macro eNodeB, are configured. Transmissions may be prevented by silencing the PRS transmissions or by configuring the RRHs not to transmit PRS. At block 612, the remote radio heads communicate in accordance with the configuration.

In FIG. 6B, a method 602 is illustrated. At block 620, the remote radio heads (RRHs) are configured. At block 622, the RRHs receive uplink transmissions from a UE (user equipment). At block 624, the position location of a UE is determined based on received signal time difference (RSTD) measurements of the uplink transmissions at the RRHs and macro eNodeB.

In FIG. 6C, a method 603 is provided. At block 620, a unique position location reference signal (PRS) is generated for a transmitter based on a virtual cell ID or a unique cell global identification (CGIs) of the transmitter. The transmitter can be an RRH or other type of transmitter. At block 622, the transmitter transmits the unique position location reference signal.

Figure 7:
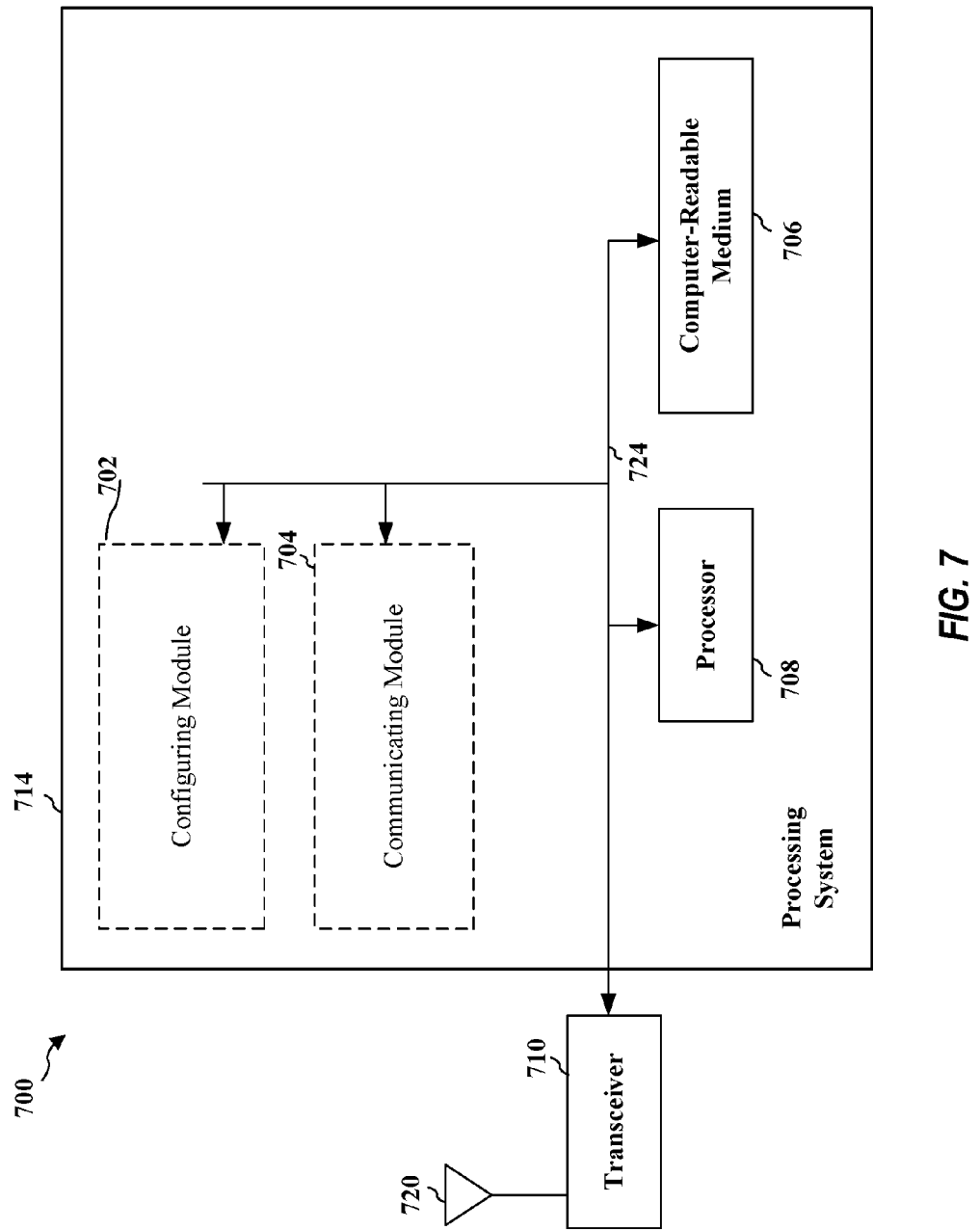
FIG. 7-9 are diagrams illustrating examples of a hardware implementation for an apparatus employing a processing system.
Figure 8:
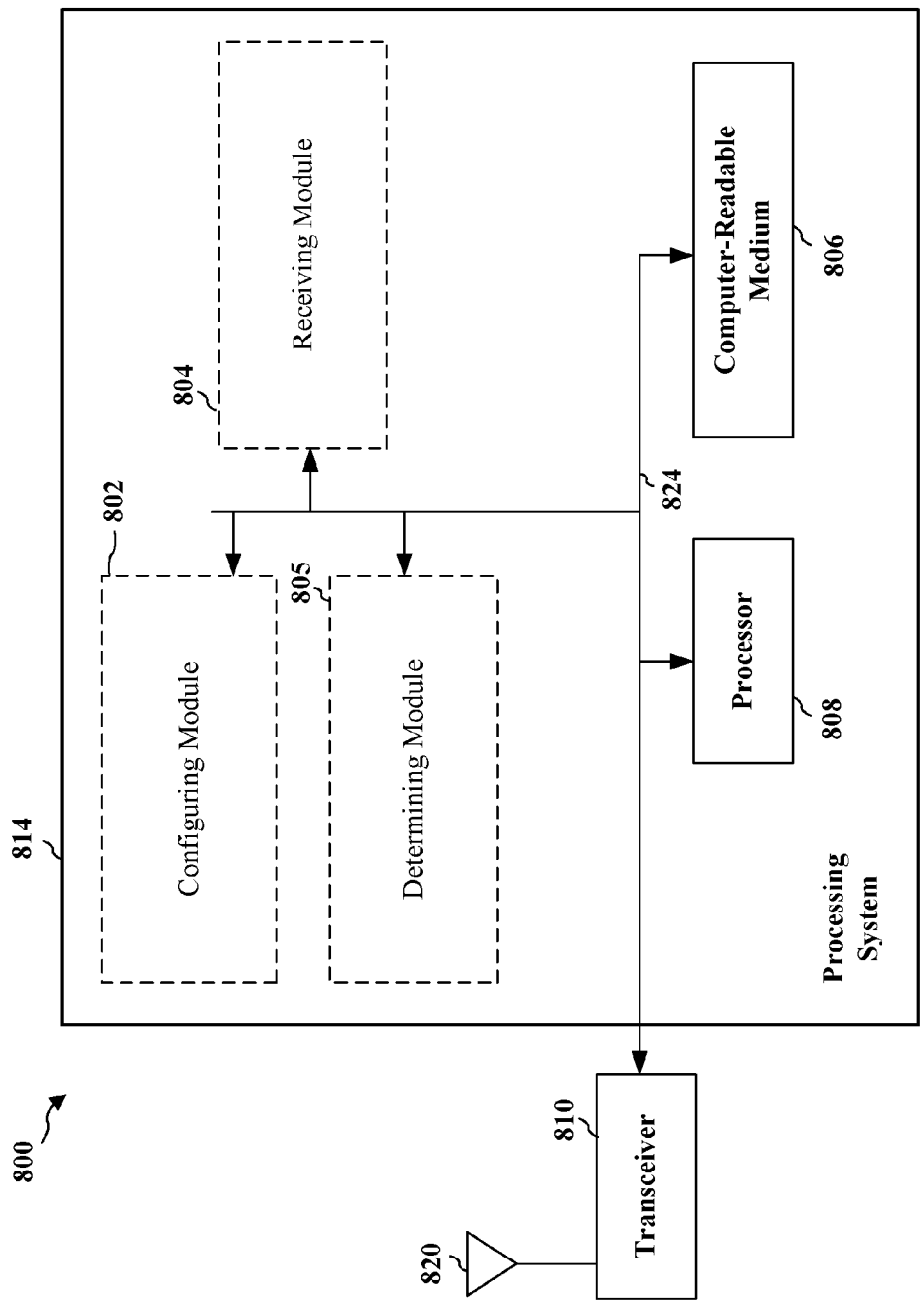
Figure 9:
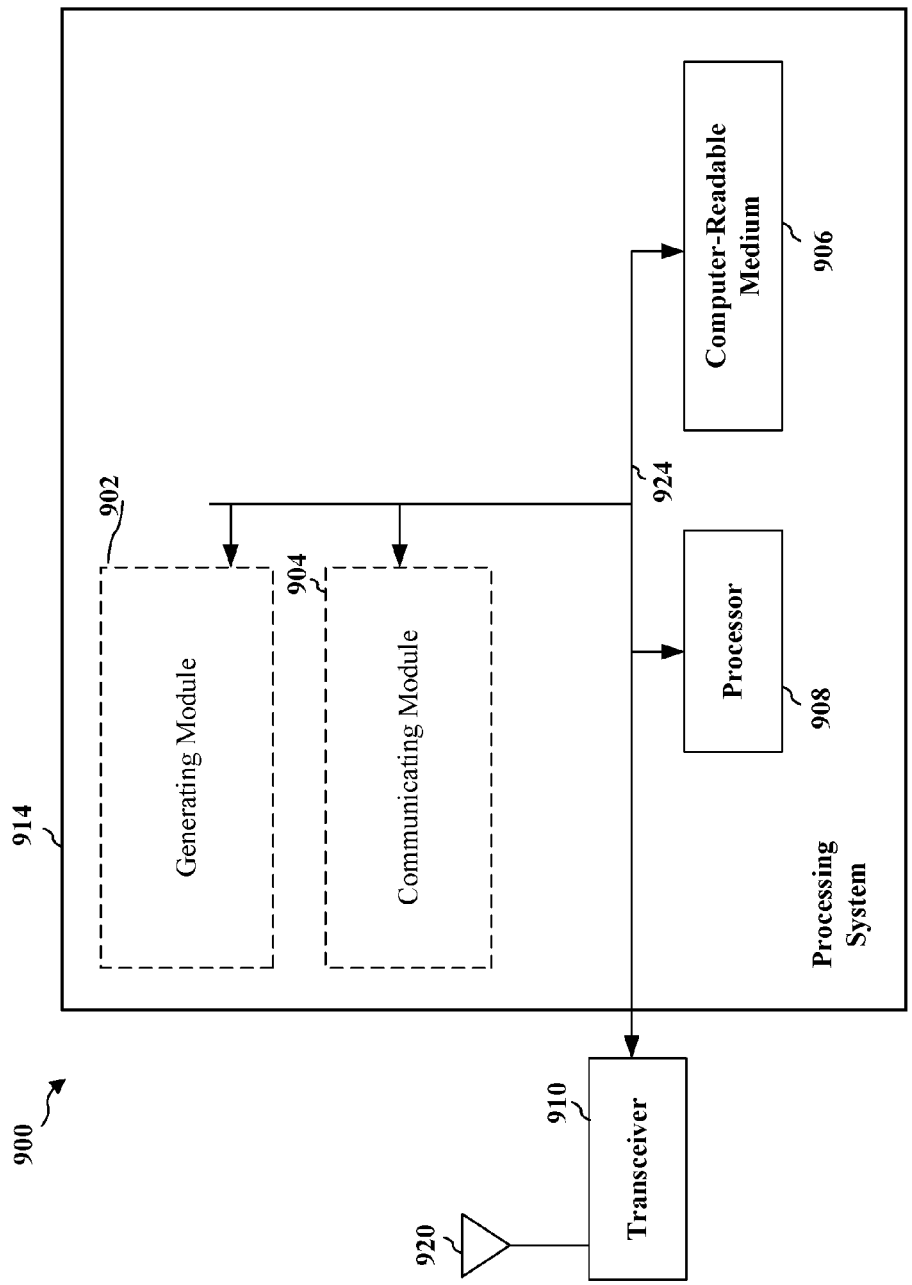

FIGS. 7-9 are diagrams illustrating an example of a hardware implementation for an apparatus 700, 800, 900 employing a processing system 714, 814, 914. The processing system 714, 814, 914 may be implemented with a bus architecture, represented generally by the bus 724, 824, 924. The bus 724, 824, 924 may include any number of interconnecting buses and bridges depending on the specific application of the processing system 714, 814, 914 and the overall design constraints. The bus 724, 824, 924 links together various circuits including one or more processors and/or hardware modules, represented by the processor 708, 808, 908, the modules 702, 704, 802, 804, 902, 904 and the computer-readable medium 706, 806, 906. The bus 724, 824, 924 may also link various other circuits such as timing sources, peripherals, voltage regulators, and power management circuits, which are well known in the art, and therefore, will not be described any further.

The apparatus includes a processing system 714, 814, 914 coupled to a transceiver 710, 810, 910. The transceiver 710, 810, 910 is coupled to one or more antennas 720, 820, 920. The transceiver 710, 810, 910 enables communicating with various other apparatus over a transmission medium. The processing system 714, 814, 914 includes a processor 708, 808, 908 coupled to a computer-readable medium 706, 806, 906. The processor 708, 808, 908 is responsible for general processing, including the execution of software stored on the computer-readable medium 706, 806, 906. The software, when executed by the processor 708, 808, 908 causes the processing system 714, 814, 914 to perform the various functions described for any particular apparatus. The computer-readable medium 706, 806, 906 may also be used for storing data that is manipulated by the processor 708, 808, 908 when executing software.

The processing system of FIG. 7 includes a configuring module 702 and a communicating module 704. The configuring module can configure remote radio heads (RRHs), each having the same physical cell ID as a macro eNodeB, to prevent position location reference signal (PRS) transmissions on the subframes where a macro eNodeB is transmitting PRS. The communicating module can cause the remote radio heads to communicate in accordance with the configuration. The modules may be software modules running in the processor 708, resident/stored in the computer-readable medium 706, one or more hardware modules coupled to the processor 708, or some combination thereof. The processing system 714 may be a component of the eNodeB 110, 110x, 110y, and may include the memory 442, the transmit processor 420, the receive processor 438, the modulators/demodulators 432a-t, the antenna 434a-t, and/or the controller/processor 440.

The processing system of FIG. 8 includes a configuring module 802, a receiving module 804 and a determining module 805. The configuring module can configure a plurality of remote radio heads (RRHs). The receiving module can receive uplink transmissions from a user equipment. The determining module can determine a position location of the UE. The modules may be software modules running in the processor 808, resident/stored in the computer-readable medium 806, one or more hardware modules coupled to the processor 808, or some combination thereof. The processing system 814 may be a component of the eNodeB 110, 110x, 110y, and may include the memory 442, the transmit processor 420, the receive processor 438, the modulators/demodulators 432a-t, the antenna 434a-t, and/or the controller/processor 440.

The processing system of FIG. 9 includes a generating module 902 and a transmitting module 904. The generating module can generate a unique position location reference signal (PRS) for a remote radio head (RRH) based on a virtual cell ID or unique cell global identifications (CGIs) of the remote radio head. The transmitting module can cause the remote radio head to transmit the unique position location signal. The modules may be software modules running in the processor 908, resident/stored in the computer-readable medium 906, one or more hardware modules coupled to the processor 908, or some combination thereof. The processing system 914 may be a component of the eNodeB 110, 110x, 110y, and may include the memory 442, the transmit processor 420, the receive processor 438, the modulators/demodulators 432a-t, the antenna 434a-t, and/or the controller/processor 440.

In one configuration, an eNodeB 110 configures a remote radio head for wireless communication and includes a means for configuring. In one aspect, the configuring means may be the transmit processor 420, the modulators 432a-t, the antenna 434a-t, the controller/processor 440, and/or the memory 442 configured to perform the functions recited by the configuring means. The eNodeB 110 is also configured to include a means for communicating. In one aspect, the communicating means may be the transmit processor 420, the modulators 432a-t, the antenna 434a-t, the controller/processor 440, the memory 442 and/or the receive processor 438 configured to perform the functions recited by the communicating means. In another aspect, the aforementioned means may be any module or any apparatus configured to perform the functions recited by the aforementioned means.

In another configuration a base station 110 (e.g., a remote radio head) includes a means for configuring. In one aspect, the configuring means may be the transmit processor 420, the modulators 432a-t, the antenna 434a-t, the controller/processor 440, and/or the memory 442 configured to perform the functions recited by the configuring means. The eNodeB 110 is also configured to include a means for receiving. In one aspect, the receiving means may be the antenna 434a-t, the demodulators 432a-t, the MIMO detector 436, the receive processor 438, the controller/processor 440 and/or the memory 442 configured to perform the functions recited by the receiving means. In another aspect, the aforementioned means may be any module or any apparatus configured to perform the functions recited by the aforementioned means.

In another configuration, a base station 110 (e.g., a remote radio head) includes a means for generating. In one aspect, the generating means may be the controller/processor 440, and/or the memory 442 configured to perform the functions recited by the configuring means. The base station 110 is also configured to include a means for transmitting. In one aspect, the transmitting means may be the transmit processor 420, the modulators 432a-t, the antenna 434a-t, the controller/processor 440, and/or the memory 442 configured to perform the functions recited by the communicating means. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    generating a position reference signal (PRS) for a transmitter having a same physical cell identity (PCI) as a macro eNodeB, the PRS being based on at least one of a virtual cell ID and a cell global identification (CGI) of the transmitter such that the PRS is different from a PRS of the macro eNodeB; and
    transmitting the PRS to a user equipment located in a region of a cell of the transmitter that overlaps with a cell of the macro eNodeB.

2. The method of claim 1, further comprising signaling to a user equipment (UE) that the PRS is based on at least one of the cell global identification or the virtual cell ID.

3. The method of claim 1, further comprising signaling to a user equipment (UE), a position reference signal configuration of a plurality of transmitters in neighboring cells when the UE is near a serving cell boundary.

4. The method of claim 1, further comprising:
receiving uplink transmissions from a user equipment (UE); and
determining a position location of the UE based on the received uplink transmissions.

5. The method of claim 1, in which the transmitter comprises a remote radio head (RRH).

6. An apparatus for wireless communication, comprising:
a memory; and
at least one processor coupled to the memory, the at least one processor being configured:
to generate a position reference signal (PRS) for a transmitter having a same physical cell identity (PCI) as a macro eNodeB, the PRS being based on at least one of a virtual cell ID and a cell global identification (CGI) of the transmitter such that the PRS is different from a PRS of the macro eNodeB; and
to transmit the PRS to a user equipment located in a region of a cell of the transmitter that overlaps with a cell of the macro eNodeB.

7. The apparatus of claim 6, in which the processor is further configured to signal to a user equipment (UE) that the PRS is based on at least one of the cell global identification or the virtual cell ID.

8. The apparatus of claim 6, in which the processor is further configured to signal to a user equipment (UE), a position reference signal configuration of a plurality of transmitters in neighboring cells when the UE is near a serving cell boundary.

9. The apparatus of claim 6, in which the processor is further configured:
to receive uplink transmissions from a user equipment (UE); and
to determine a position location of the UE based on the received uplink transmissions.

10. The apparatus of claim 6, in which the transmitter comprises a remote radio head (RRH).

11. A non-transitory computer-readable medium having non-transitory program code recorded thereon for wireless communication in a wireless network, the program code being executed by at least one processor and comprising:
program code to generate a position reference signal (PRS) for a transmitter having a same physical cell identity (PCI) as a macro eNodeB, the PRS being based on at least one of a virtual cell ID and a cell global identification (CGI) of the transmitter such that the PRS is different from a PRS of the macro eNodeB; and
program code to transmit the PRS to a user equipment located in a region of a cell of the transmitter that overlaps with a cell of the macro eNodeB.

12. The non-transitory computer-readable medium of claim 11, in which the program code further comprises program code to signal to a user equipment (UE) that the PRS is based on at least one of the cell global identification or the virtual cell ID.

13. The non-transitory computer-readable medium of claim 11, in which the program code further comprises program code to signal to a user equipment (UE), a position reference signal configuration of a plurality of transmitters in neighboring cells when the UE is near a serving cell boundary.

14. The non-transitory computer-readable medium of claim 11, in which the program code further comprises:
program code to receive uplink transmissions from a user equipment (UE); and
program code to determine a position location of the UE based on the received uplink transmissions.

15. The non-transitory computer-readable medium of claim 11, in which the transmitter comprises a remote radio head (RRH).

16. An apparatus for wireless communication, comprising:
means for generating a position reference signal (PRS) for a transmitter having a same physical cell identity (PCI) as a macro eNodeB, the PRS being based on at least one of a virtual cell ID and a cell global identification (CGI) of the transmitter such that the PRS is different from a PRS of the macro eNodeB; and
means for transmitting the PRS to a user equipment located in a region of a cell of the transmitter that overlaps with a cell of the macro eNodeB.

17. The apparatus of claim 16, further comprising means for signaling to a user equipment (UE) that the PRS is based on at least one of the cell global identification or the virtual cell ID.

18. The apparatus of claim 16, further comprising means for signaling to a user equipment (UE), a position reference signal configuration of a plurality of transmitters in neighboring cells when the UE is near a serving cell boundary.

19. The apparatus of claim 16, further comprising:
means for receiving uplink transmissions from a user equipment (UE); and
means for determining a position location of the UE based on the received uplink transmissions.

20. The apparatus of claim 16, in which the transmitter comprises a remote radio head (RRH).

* * * * *